(12) United States Patent
Collett

(10) Patent No.: US 10,821,038 B2
(45) Date of Patent: Nov. 3, 2020

(54) RAMP SYSTEM FOR A MOTORIZED VEHICLE

(71) Applicant: Freedom Motors Inc., Toronto, Ontario (CA)

(72) Inventor: Paul Collett, Toronto (CA)

(73) Assignee: Freedom Motors, Inc., Toronto, Ontario (CA)

( * ) Notice: Subject to any disclaimer, the term of this patent is extended or adjusted under 35 U.S.C. 154(b) by 36 days.

(21) Appl. No.: 16/171,403

(22) Filed: Oct. 26, 2018

(65) Prior Publication Data

US 2020/0129350 A1  Apr. 30, 2020

(51) Int. Cl.
*A61G 3/06* (2006.01)
*B60P 1/43* (2006.01)

(52) U.S. Cl.
CPC .............. *A61G 3/061* (2013.01); *B60P 1/433* (2013.01); *B60P 1/435* (2013.01); *Y10S 414/134* (2013.01)

(58) Field of Classification Search
CPC .......... A61G 3/061; B60P 1/433; B60P 1/435; Y10S 414/134
USPC ....................................................... 414/921
See application file for complete search history.

(56) References Cited

U.S. PATENT DOCUMENTS

| | | | | |
|---|---|---|---|---|
| 3,510,015 A | * | 5/1970 | Roshaven | B60P 1/435 414/537 |
| 4,761,847 A | * | 8/1988 | Savage | B65G 69/30 108/167 |
| 5,588,663 A | * | 12/1996 | Rundle | A47C 7/70 108/44 |
| 6,158,798 A | * | 12/2000 | Stedtfeld | B60P 1/43 182/127 |
| 6,695,565 B1 | * | 2/2004 | Franchuk | B60P 3/07 414/462 |
| 6,887,028 B1 | * | 5/2005 | Kirla, Jr. | B60P 1/435 14/69.5 |
| 7,344,184 B2 | * | 3/2008 | Salvador | B60P 1/435 296/183.1 |

(Continued)

FOREIGN PATENT DOCUMENTS

| | | | | |
|---|---|---|---|---|
| DE | 202016105411 U1 | * | 1/2018 | ............. B60P 1/435 |
| EP | 3476379 A1 | * | 5/2019 | ............. A61G 3/067 |

(Continued)

OTHER PUBLICATIONS

Vision by Viewpoint Mobility, Technical Service Manual, Removal and Installation of Ramp Systems, p. 2-36.

(Continued)

*Primary Examiner* — James Keenan
(74) *Attorney, Agent, or Firm* — Harness, Dickey & Pierce, P.L.C.

(57) ABSTRACT

A ramp system comprising a cradle adapted to be received in a vehicle storage area, a first ramp member defining a first top surface and comprising a proximal end hingeably connected to a distal end of the cradle, and a second ramp member defining a second top surface, the second ramp member being separate from the first ramp member. In use, the first ramp member is pivotable between a first position and a second position wherein the first ramp member is oriented towards the ground surface and the second ramp member is movable between a first position and second position wherein the second ramp member is oriented towards the ground surface. In the second positions, the first and second top surfaces of the first and second ramp members define rolling surfaces allowing a wheelchair to roll over the first and second surfaces.

22 Claims, 13 Drawing Sheets

(56) References Cited

U.S. PATENT DOCUMENTS

| | | | | |
|---|---|---|---|---|
| 7,708,294 | B2* | 5/2010 | Demick | B60P 1/43 |
| | | | | 280/163 |
| 8,104,128 | B2* | 1/2012 | Kawaguchi | A61G 3/061 |
| | | | | 119/849 |
| 9,597,240 | B2* | 3/2017 | Hermanson | A61G 3/061 |
| 9,855,877 | B2* | 1/2018 | Aftanas | B65G 69/30 |
| 2014/0255138 | A1* | 9/2014 | Bruns | A61G 3/061 |
| | | | | 414/537 |
| 2017/0216113 | A1 | 8/2017 | Kiser et al. | |
| 2017/0340493 | A1* | 11/2017 | Sidhu | B60P 1/435 |

FOREIGN PATENT DOCUMENTS

| | | | | |
|---|---|---|---|---|
| FR | 2598362 A1 * | 11/1987 | | A61G 3/061 |
| FR | 2997665 A1 * | 5/2014 | | B60P 1/433 |

OTHER PUBLICATIONS

Vision by Viewpoint Mobility, Technical Service Manual, Door/Ramp Blocks and Striker Plate Chrysler OEM Hatch, p. 2-51.
Savaria Vehicle Group, Ramp Pre-Assembly—Sienna, Schematic designs, Jun. 28, 2011, p. 1.
Savaria Vehicle Group, Ramp Sub-Assembly, Lay Flat—Sienna, Schematic designs, Jun. 11, 2012, pp. 1 to 4.
Collett, P., Liberty Motor Company Inc., Caravan Advantage Ramp Installation, Procedure: CLF07-02, Mar. 6, 2010, pp. 1-11.
Bourne, G., Liberty Motor Company Inc., Assembly Instructions: Ramp assembly & installation, Procedure: FRE05-03, Dec. 23, 2005, pp. 1-13.
Collett, P., Liberty Motor Company Inc., Assembly Instructions: Rear Ramp Installation 1999-2002, Procedure: WIN21-01, Oct. 23, 2012, pp. 1 to 10.

* cited by examiner

RAMP SYSTEM FOR A MOTORIZED VEHICLE

FIELD

The present invention relates to a ramp system for a motorized vehicle comprising a first ramp member and a second ramp member that is separate from the first ramp member.

BACKGROUND

For wheelchair passengers, entering and exiting motorized vehicles may be a difficult task. The main obstacle resides in the fact that the floor of the passenger compartment is elevated off the ground.

Some vehicles are specifically designed to be wheelchair accessible. For example, some vehicles are provided with a powered lift including a platform that can rest on the ground to allow the wheelchair passenger to roll on to it and subsequently raised at the level of the passenger compartment floor in order to allow the wheelchair passenger to roll of the platform and into the passenger compartment. Other vehicles may be provided with a ramp configured to be angled between the floor of the passenger compartment and the ground to allow the wheelchair to be rolled along the ramp and into the passenger compartment. However, existing lifts and ramps may be cumbersome and/or may offer few options for the passenger or user.

Moreover, when the ground surface includes multiple levels, such as a road and a sidewalk adjacent the road, the vehicle's operator may be required to positioned close to the curb to allow the wheelchair to exit from the vehicle directly onto the sidewalk, which may be impractical and even dangerous.

US Patent Publication 2017/0216113 discloses a retractable ramp system for motorized vehicles. The ramp system includes a ramp connected to a frame and a pivotable rear member operable between a closed and opened position to allow access and operation of the ramp. The ramp is operable to slide along a pair of tracks mounted within the frame and to extend over the rear member to allow access to a wheelchair over the ramp. The ramp can be operated between a stored position, a lowered position and a stowed position. In use, the ramp is moved along the pair of tracks up to the lowered position where the ramp entirely covers the rear member. The rear member forms no part of any rolling surface and the rear member rather essentially supports the ramp.

For these and other reasons, there is a need in the industry for an improved access ramp for motorized vehicles that alleviates at least in part the deficiencies of existing ramp systems for motorized vehicles by providing a ramp system with a first ramp member and a separate second ramp member. The first ramp member is connected to the frame/vehicle and is pivotable between first and second positions and the second separate ramp member is movable between first and second positions. In use, when the first and second ramp members are each in the second position, the first and second top surfaces of the first and second ramp members define rolling surfaces allowing a wheelchair to roll over the first and second surfaces to access or exit the storage area of the vehicle. Moreover, because the second ramp member is a different, distinct, separate element from the first ramp member, in use, the second ramp member is further moveable to a curb position wherein the second ramp member at least partially overlaps a curb to allow the wheelchair to roll over the second top surface and moved from the ground surface to the curb.

SUMMARY

As embodied and broadly described herein, according to a broad aspect, the invention provides a ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane that intersects the longitudinal axis, the ramp system comprising: a cradle being adapted to be received in the storage area, the cradle having left and right side walls, proximal and distal ends and a floor extending from the proximal and distal ends along the longitudinal axis and between the left and right side walls; a first ramp member comprising a proximal end hingeably connected to the distal end of the cradle, a distal end located opposite the proximal end, left and right side edges, a first top surface defined between the proximal and distal ends and left and right side edges of the first ramp member, and a first bottom surface opposite the first top surface; and a second ramp member comprising a proximal end, a distal end located opposite the proximal end, left and right side edges, a second top surface defined between the proximal and distal ends and left and right side edges of the second ramp member, and a second bottom surface opposite the second top surface, the second ramp member being separate from the first ramp member; wherein, in use, the first ramp member is pivotable between a first position, wherein the first bottom surface of the first ramp member is located in a height plane that is generally parallel to the height plan, and a second position, wherein the first ramp member is oriented towards the ground surface and a portion of the first bottom surface contacts the ground surface, the second ramp member is movable between first and second positions, wherein in the second position, the proximal end of the second ramp member is connected to the distal end of the first ramp member, the second ramp member is oriented towards the ground surface, and a portion of the second bottom surface contacts the ground surface proximate the distal end of the second ramp member; and wherein, when the first and second ramp members are each in the second position, the first and second top surfaces of the first and second ramp members define rolling surfaces allowing a wheelchair to roll over the first and second surfaces to access or exit the storage area.

As embodied and broadly described herein, according to another broad aspect, the invention provides a ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane that intersects the longitudinal axis, the ramp system comprising: a cradle being adapted to be received in the storage area, the cradle having left and right side walls, proximal and distal ends and a floor extending from the proximal and distal ends along the longitudinal axis and between the left and right side walls; a first ramp member comprising a proximal end hingeably connected to the distal end of the cradle, a distal end located opposite the proximal end, left and right side walls extending upwardly, a first top surface defined between the proximal and distal ends and left and right side walls of the first ramp member, and a first bottom surface opposite the first top surface, the left and right side walls each having external and internal sides, the first ramp member comprising left and right projections located adjacent its distal end and mounted on its left and right side walls on the internal sides; and a second ramp member comprising a proximal end, a distal end located opposite the proximal end, left and right side walls extending upwardly, a second top surface defined between the proximal and distal ends and left and right side walls of the second ramp member, and a second bottom surface opposite the second top surface, the left and right side walls each having external and internal sides, the second ramp member being separate from the first ramp member, the second ramp member comprising left and right wheels located adjacent its proximal end and mounted on its left and right side walls on the external sides; wherein, in use, the first ramp member is pivotable between a first position, wherein the first bottom surface of the first ramp member is located in a height plane that is generally parallel to the height plan, and a second position, wherein the first ramp member is oriented towards the ground surface and a portion of the first bottom surface contacts the ground surface, the left and right wheels being adapted to roll over the top surface of the first ramp member for moving the second ramp member between first and second positions, wherein in the second position, the left and right wheels abut the respective left and right projections of the first ramp member such that the proximal end of the second ramp member is connected to the distal end of the first ramp member, the second ramp member is oriented towards the ground surface, and a portion of the second bottom surface contacts the ground surface proximate the distal end of the second ramp member; and wherein, when the first and second ramp members are each in the second position, the first and second top surfaces of the first and second ramp members define rolling surfaces allowing a wheelchair to roll over the first and second surfaces to access or exit the storage area.

As embodied and broadly described herein, according to a further broad aspect, the invention provides a ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane that intersects the longitudinal axis, the ramp system comprising: a cradle being adapted to be received in the storage area, a first ramp member comprising a proximal end hingeably connected to a distal end of the cradle, the first ramp member defining a first top surface and a first bottom surface opposite the first top surface, and a second ramp member defining a second top surface and a second bottom surface opposite the second top surface, the second ramp member being separate from the first ramp member; wherein, in use, the first ramp member is pivotable between a first position, wherein the first bottom surface of the first ramp member is located in a height plane that is generally parallel to the height plan, and a second position, wherein the first ramp member is oriented towards the ground surface and a portion of the first bottom surface contacts the ground surface, the second ramp member is movable between first and second positions, wherein in the second position, a proximal end of the second ramp member is connected to a distal end of the first ramp member, the second ramp member is oriented towards the ground surface, and a portion of the second bottom surface contacts the ground surface proximate the distal end of the second ramp member; and wherein, when the first and second ramp members are each in the second position, the first and second top surfaces of the first and second ramp members define rolling surfaces allowing a wheelchair to roll over the first and second surfaces to access or exit the storage area.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of the embodiments of the present invention is provided herein below, by way of example only, with reference to the accompanying drawings, in which.

Figure 1:
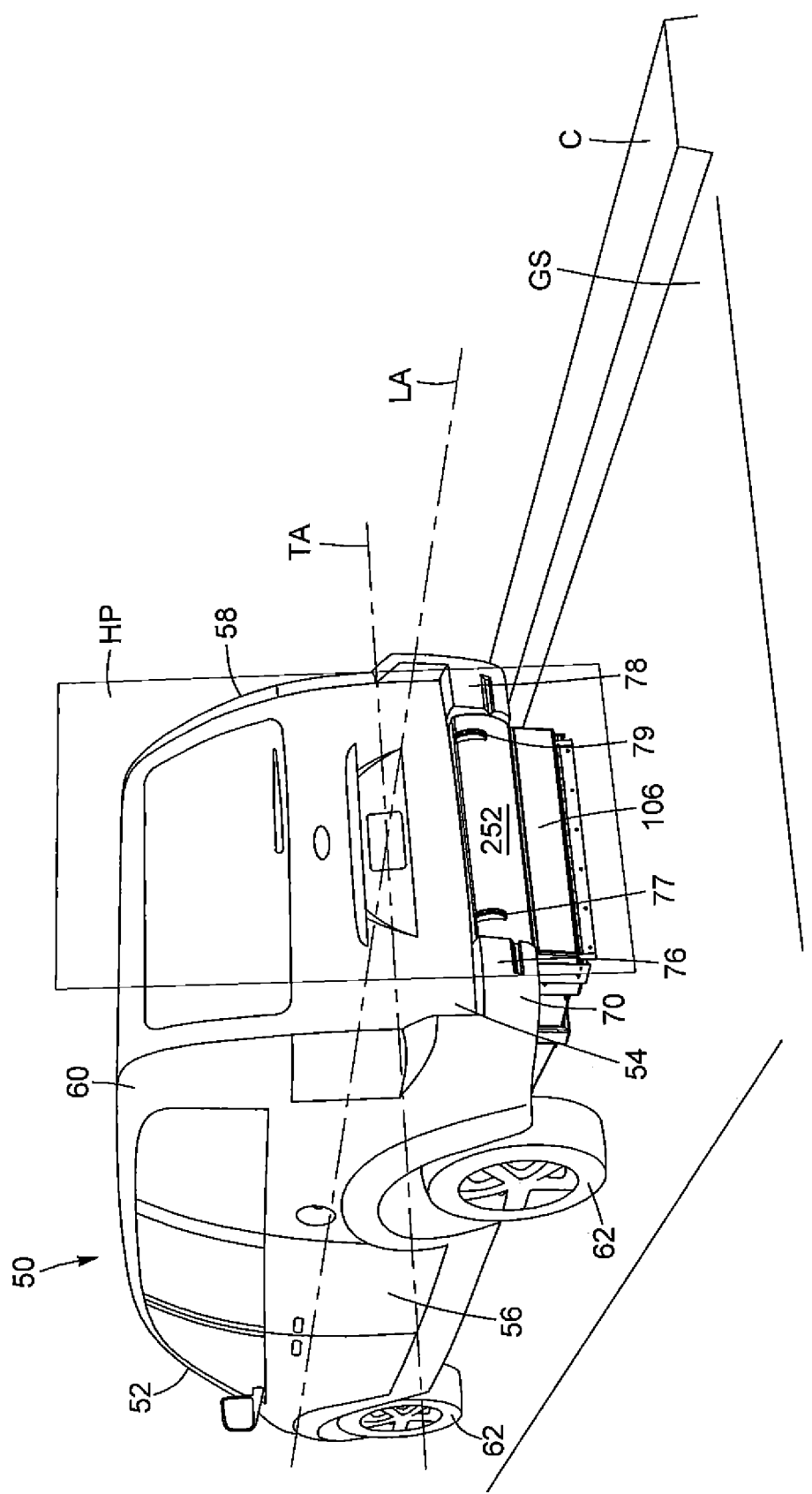
FIG. 1 is a rear left perspective view of a vehicle including a ramp system in accordance with an embodiment of the invention, the first ramp member of the ramp system being in a first position.

In the drawings, embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF EMBODIMENTS OF THE INVENTION

Before any variants, examples or preferred embodiments of the invention are explained in detail, it is to be understood that the invention is not limited in its application to the details of construction and the arrangement of components set forth in the following description or illustrated in the drawings. The invention is capable of other variants or embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional suitable items. Unless specified or limited otherwise, the terms "mounted," "connected," "supported," and "coupled" and variations thereof are used broadly and encompass both direct and indirect mountings, connections, supports, and couplings and are thus intended to include direct connections between two members without any other members interposed therebetween and indirect connections between members in which one or more other members are interposed therebetween. Further, "connected" and "coupled" are not restricted to physical or mechanical connections or couplings. Additionally, the words "lower", "upper", "upward", "down" and "downward" designate directions in the drawings to which reference is made. Similarly, the words "left", "right", "front" and "rear" designate locations or positions in the drawings to which reference is made. The terminology includes the words specifically mentioned above, derivatives thereof, and words or similar import.

Referring FIGS. 1 to 4 and 7, there is shown a vehicle 50 including a ramp system 100, in accordance with an embodiment of the invention. The vehicle 50 is a motorized vehicle which is adapted for passenger transportation such as, for example, a minivan vehicle or a van-type vehicle.

The vehicle 50 includes a front vehicle end 52, a rear end 54 and left and right sides 56, 58 extending between the front and rear ends 52, 54. The vehicle 50 further includes a vehicle body 60 extending between the front and rear ends along a longitudinal axis LA of the vehicle 50 and a plurality of wheels 62 rotatably mounted to the body 60 to allow the vehicle 50 to roll along a ground surface GS such as a road, a street or the like.

Figure 2:
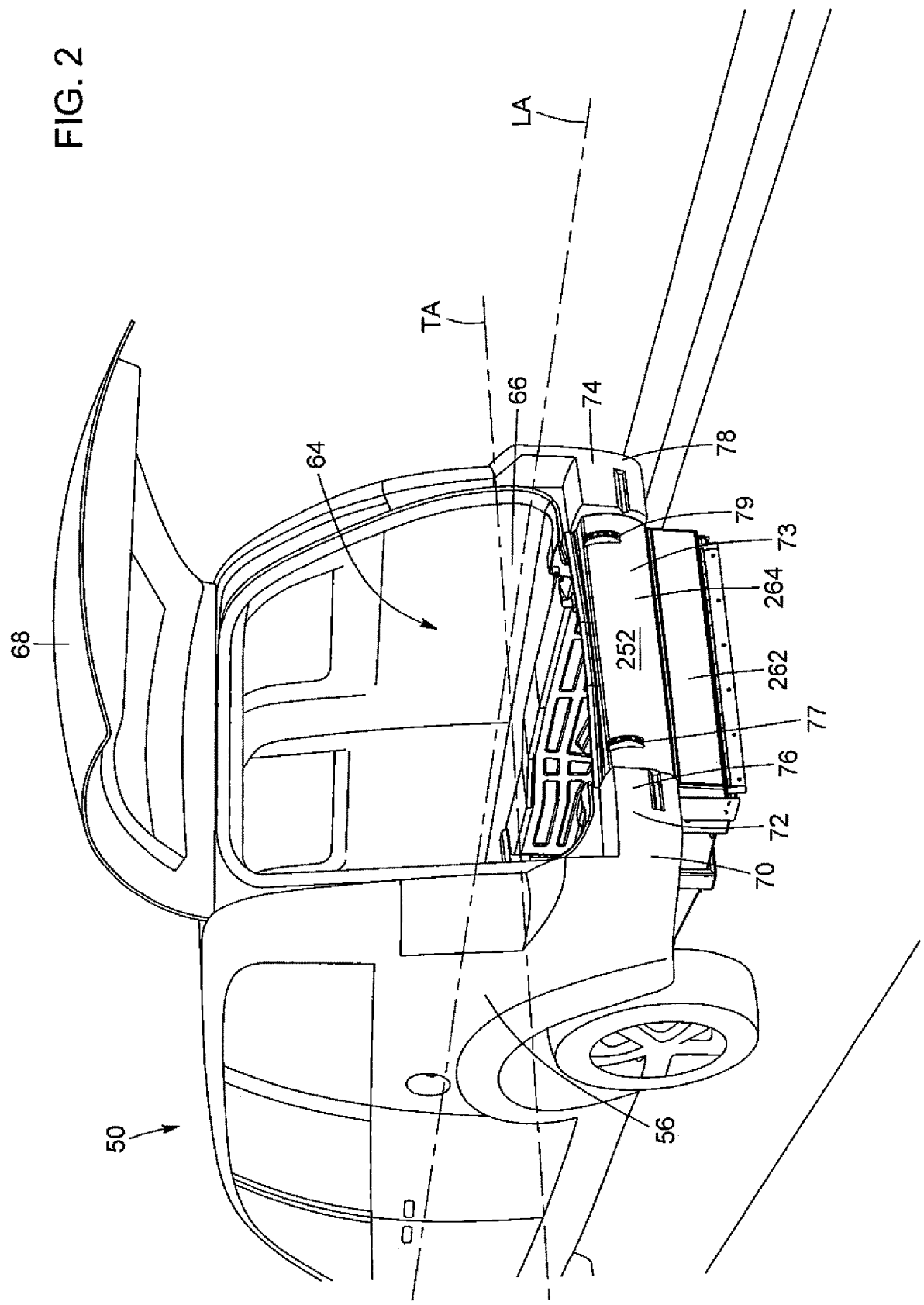
FIG. 2 is a rear left perspective view of the vehicle and ramp system of FIG. 1 with the vehicle rear door in an open position.
Figure 3:
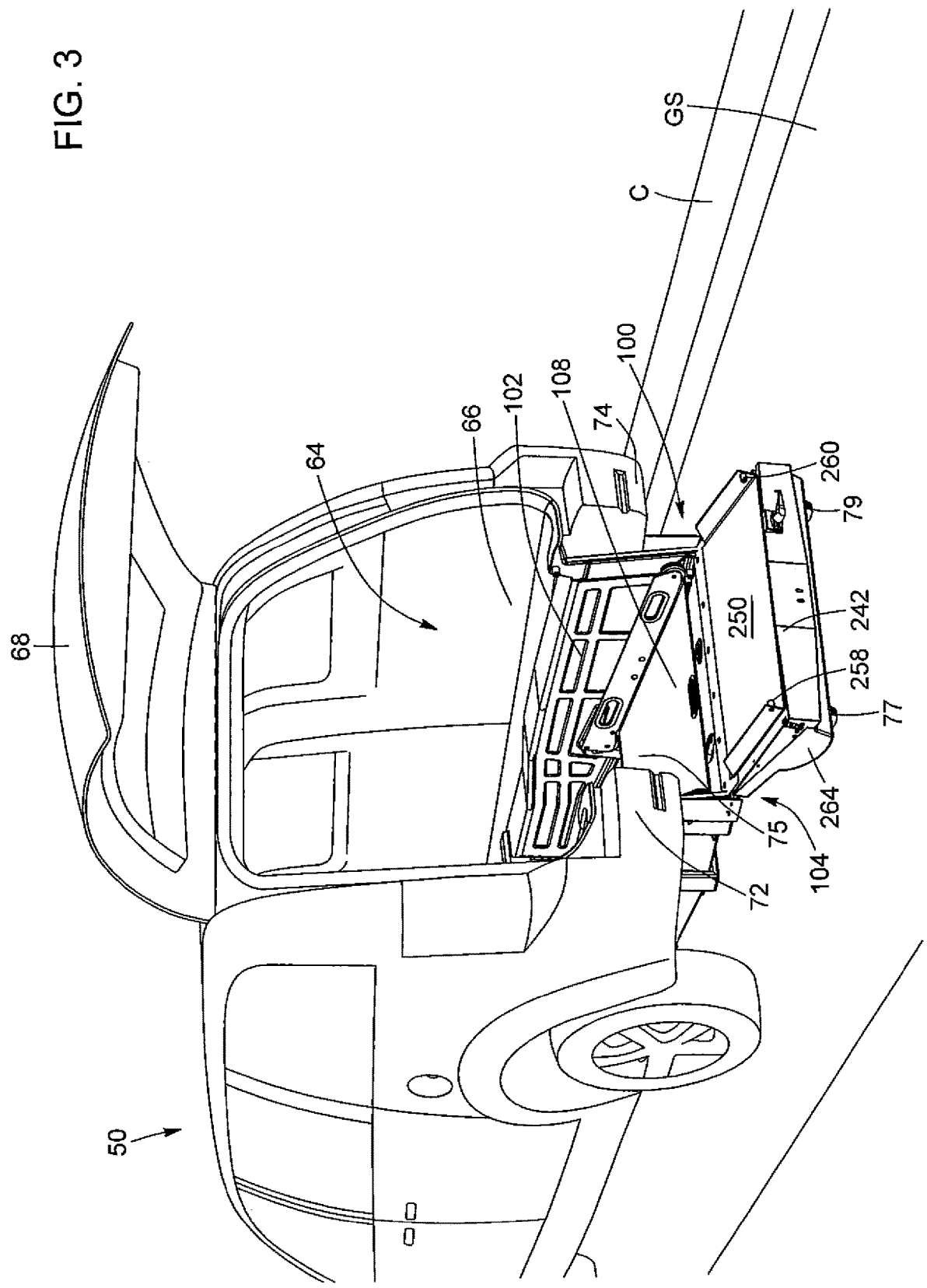
FIG. 3 is a rear left perspective view of the vehicle and ramp system of FIG. 1 with the vehicle rear door in the open position, with the first ramp member of the ramp system in a second position, and with the second ramp member of the ramp system shown in a first storage position.
Figure 7:
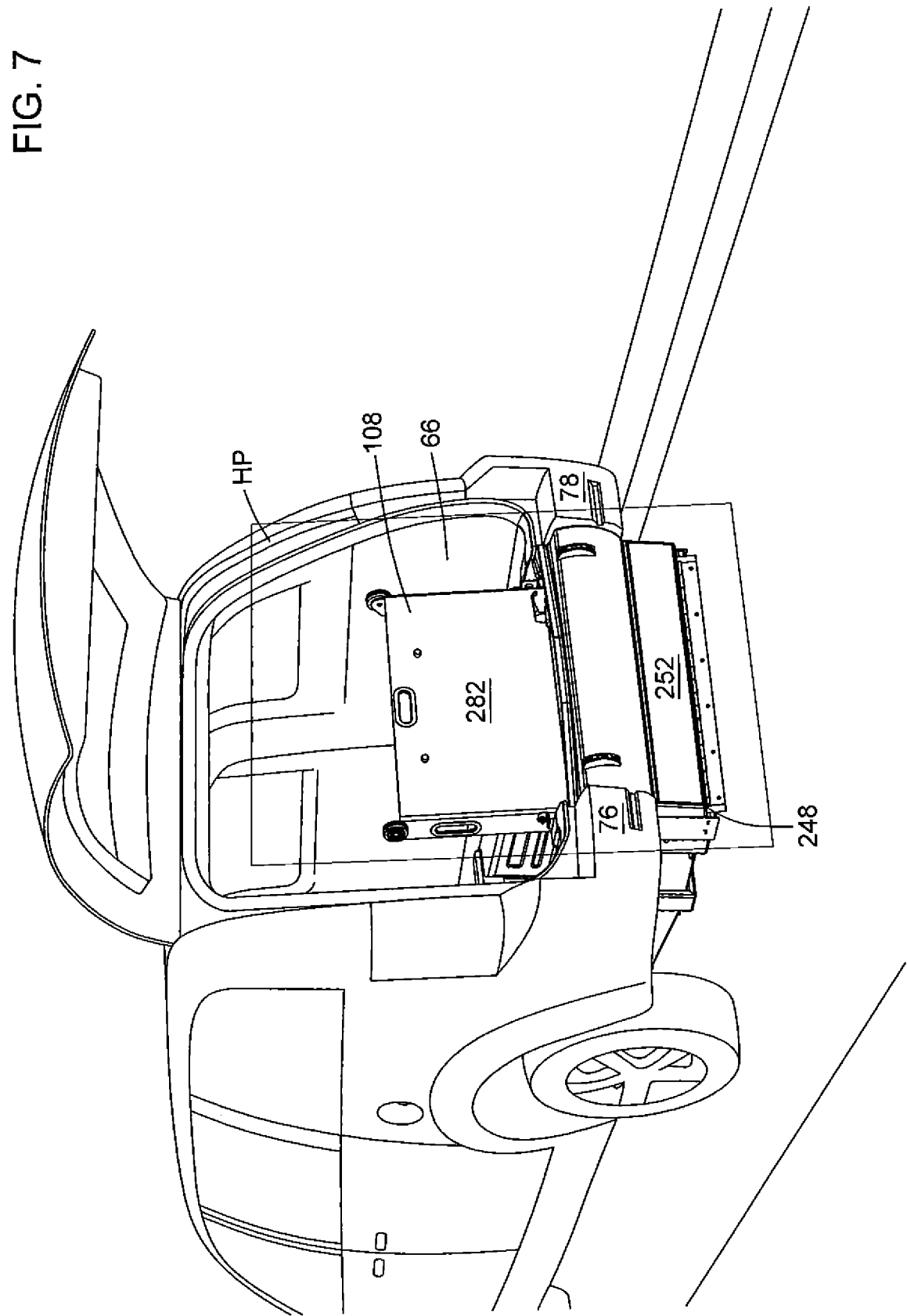
FIG. 7 is a rear left perspective view of the vehicle and ramp system of FIG. 1 with the vehicle rear door in the open position, with the first ramp member of the ramp system in the second position, and with the second ramp member of the ramp system shown in a second storage position.

The vehicle body 50 is partially hollow and includes an internal storage area 64 for receiving a passenger in a wheelchair and/or cargo. The internal storage area 64 is at least accessible through an access opening 66 located at the rear end 54 of the vehicle 50. In the illustrated embodiment, the vehicle 50 further includes a rear door 68 which is pivotably mounted to the vehicle body 60. The rear door 68 is movable between an open position in which the internal storage area 64 is accessible through the access opening 66 (as shown in FIGS. 2, 3 and 7) and a closed position in which the rear door 68 extends across the access opening 66 and thereby prevents access into the internal storage area 64 (as shown in FIG. 1). Naturally, the rear door may comprise a handle or any other types of actuators accessible by at least one hand of a user to allow the user to lock and unlock the rear door 68 with respect to the vehicle body 60 and/or to open and close the rear door 68. In the illustrated embodiment, the rear door 68 is hingeably connected to the vehicle body 60 above the access opening 66 so as to pivot rearwardly and upwardly when opened. Alternatively, the rear door could instead be hingeably connected to the vehicle body 60 to the left or to the right of the access opening 66. In yet another embodiment, the rear door could instead include two door panels, each being hingeably connected to the vehicle body 60 to the left or right of the access opening 66. In still another embodiment, instead of being hingeably connected to the vehicle body 60, the rear door could instead include one or more door panels which are slidably connected to the vehicle body 60 and which are adapted to move laterally thereto in a transversal direction relative to the vehicle 50.

Figure 4:
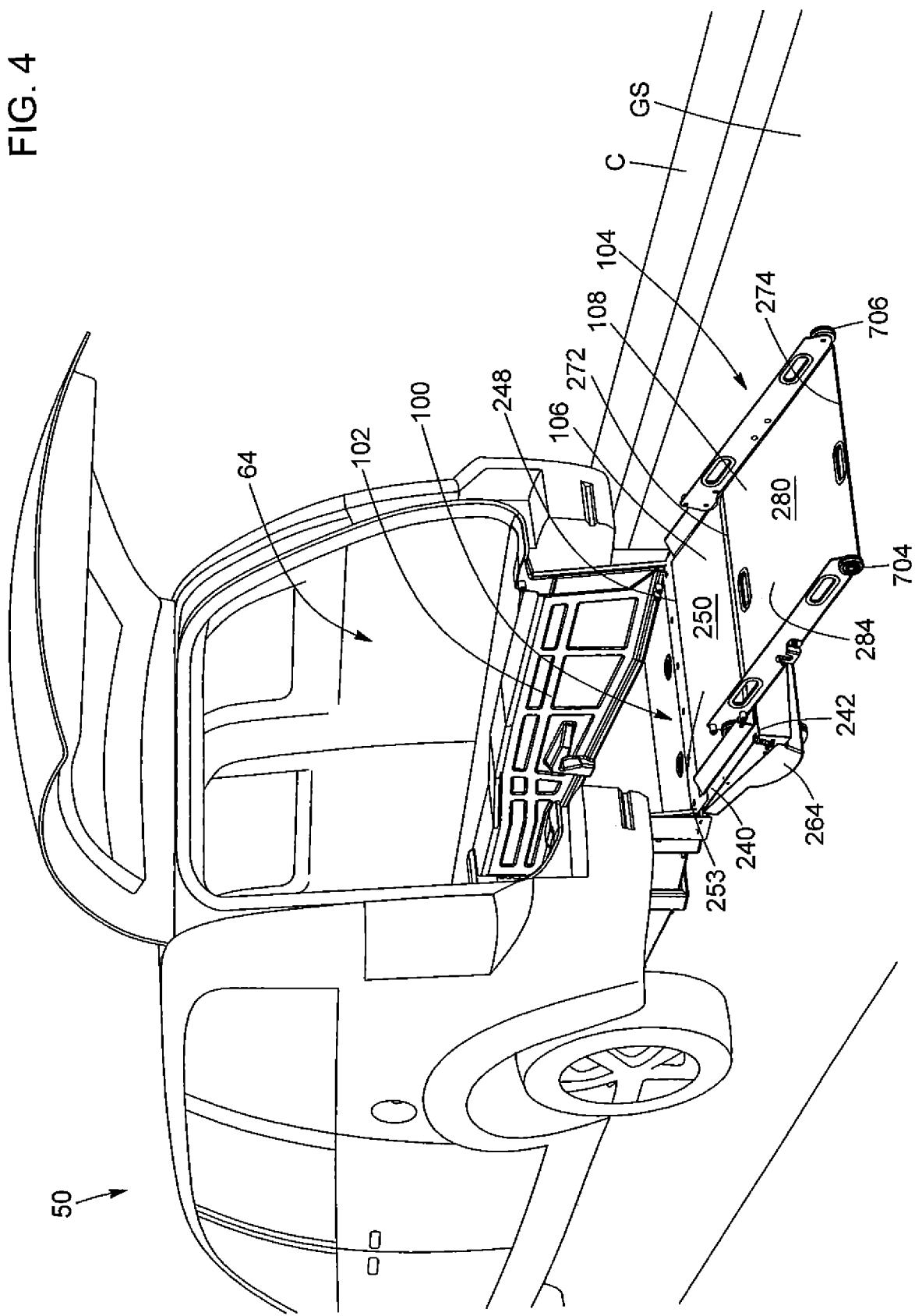
FIG. 4 is a rear left perspective view of the vehicle and ramp system of FIG. 1 with the vehicle rear door in the open position, with the first ramp member of the ramp system in the second position, and with the second ramp member of the ramp system shown in a second position.

The vehicle 50 includes a rear bumper 70 which projects rearwardly from the vehicle body 60 at the read end 54 of the vehicle 50, below the access opening 66. More specifically, the rear bumper 70 extends generally between the left and right sides 56, 58 of the vehicle 50 along a transversal axis TA that is generally perpendicular to the longitudinal axis LA of the vehicle 50. As best shown in FIGS. 3 and 4, the rear bumper 70 is not continuous, but instead includes left and right bumper portions 72, 74 which are spaced apart to define an access space 75 therebetween. The left and right bumper portions 72, 74 respectively include left and right external surfaces 76, 78 which face rearwardly away from the vehicle 50. As best shown in FIG. 1, the left and right external surfaces 76, 78 extend in a generally vertical height plane HP which intersects the longitudinal axis LA of the vehicle.

The wheels 62 extend below the vehicle body 60 and contact the ground surface GS, thereby maintaining the vehicle body 60 spaced upwardly above the ground surface GS. The ramp system 100 is configured to provide an inclined surface on which the wheelchair may roll to move between the ground surface GS and the internal storage area 64 to thereby allow the wheelchair with or without the wheelchair passenger using the wheelchair to enter or exit the internal storage area 64 of the vehicle 50.

Referring to FIGS. 3, 4, 5, 6 and 8, the ramp system 100 includes a cradle 102 with a size and shape such that it is adapted to be received in the internal storage area 64 of the vehicle 50 and a ramp assembly 104.

Figure 5:
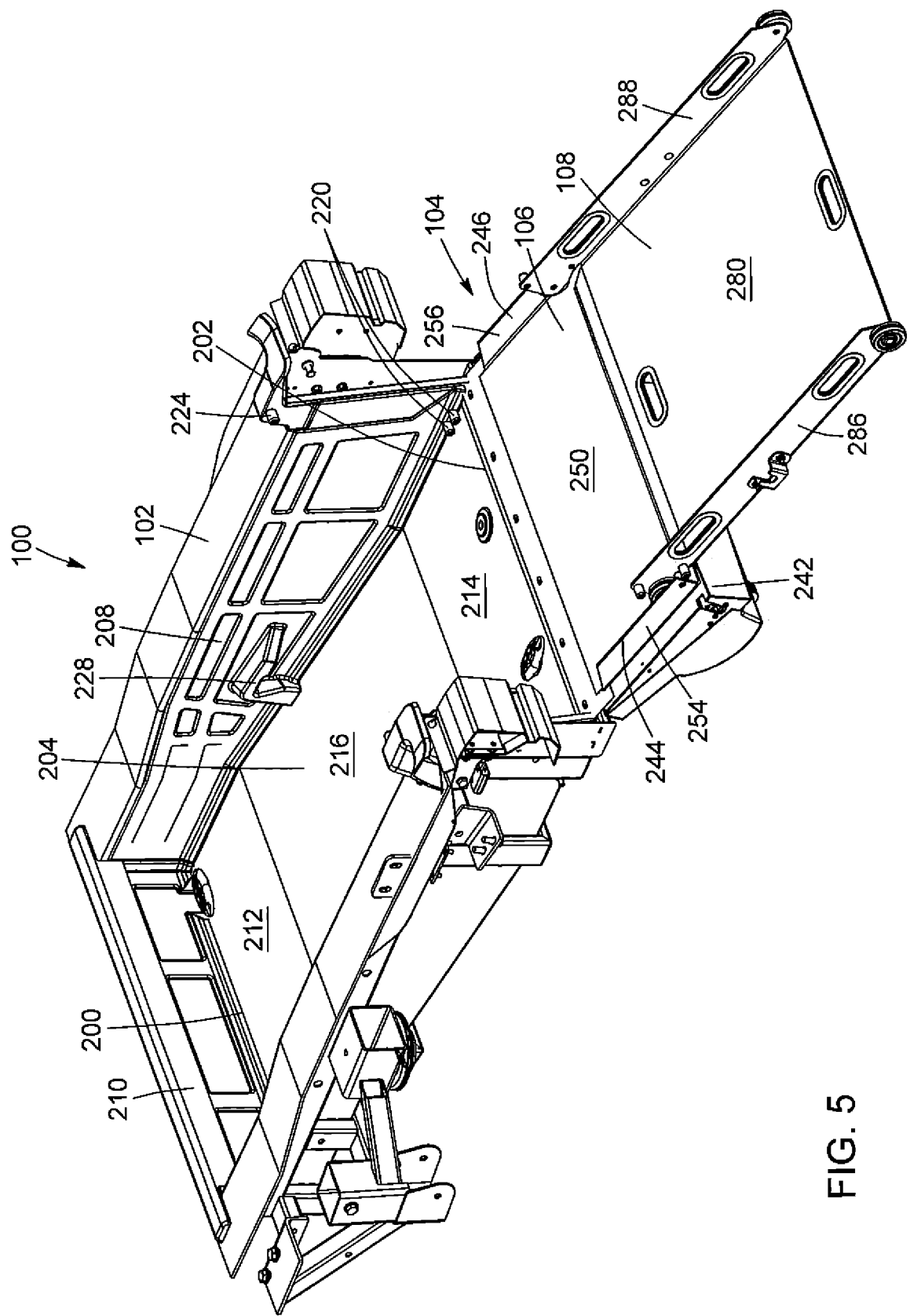
FIG. 5 is a rear left perspective view of the ramp system of FIG. 1 showing the frame of the ramp system, and with the first ramp member in the second position and the second ramp member in the second position
Figure 6:
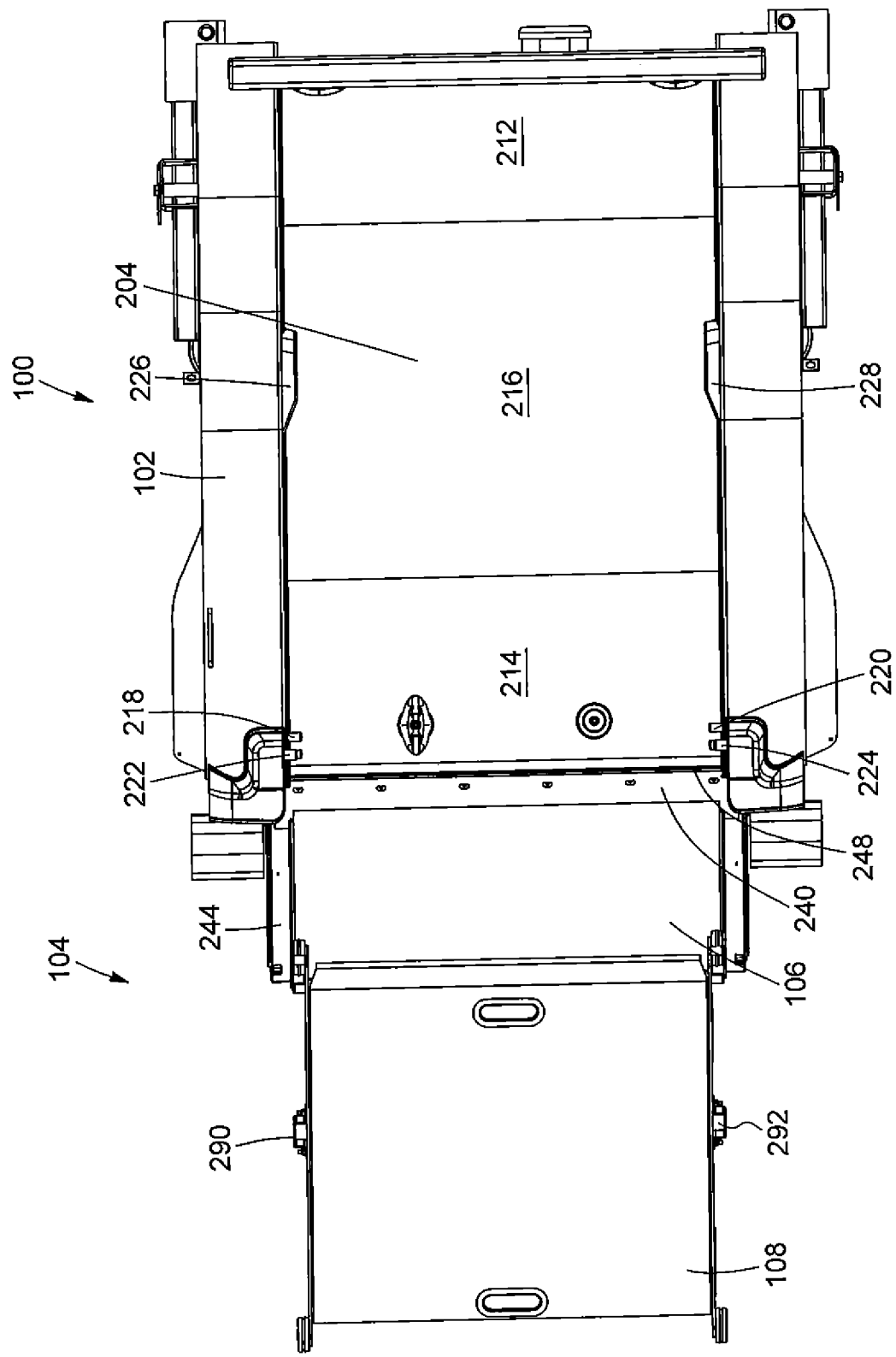
FIG. 6 is a top view of the ramp system of FIG. 5.
Figure 8:
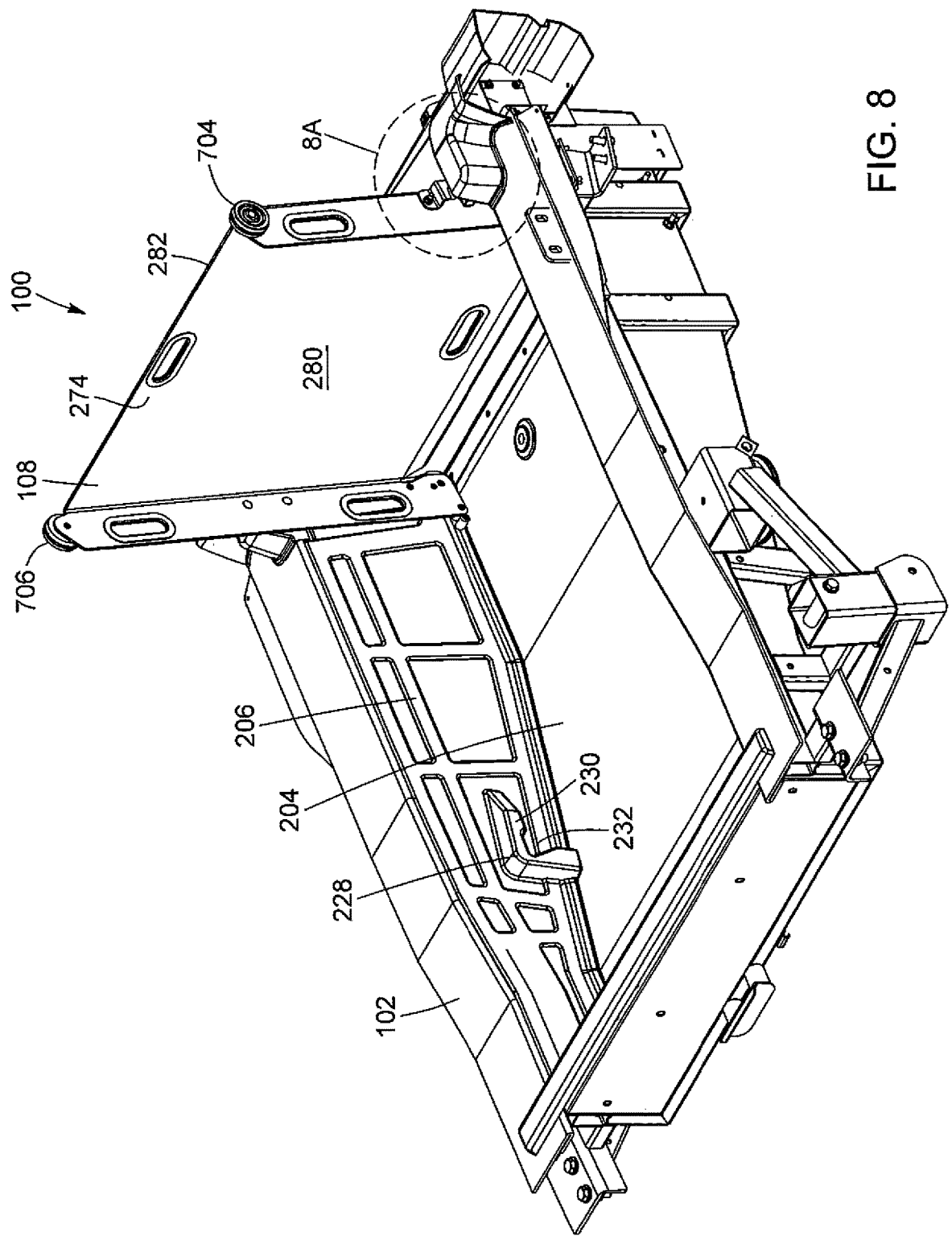
FIG. 8 is a front right perspective view of the ramp system of FIG. 7.
Figure 8A:
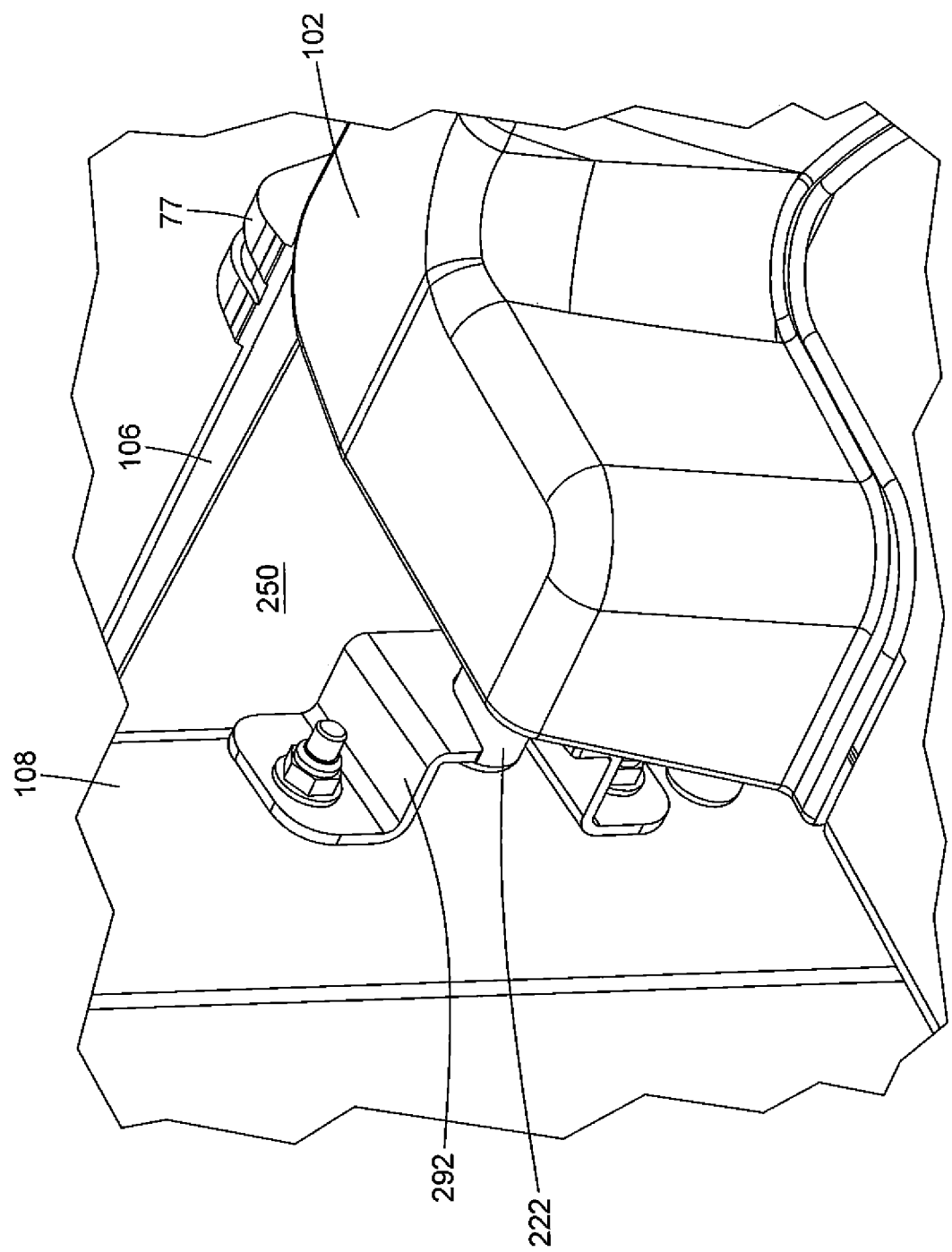
FIG. 8A is an enlarged view taken from FIG. 8.

As best seen in FIGS. 5, 6 and 8, the cradle 102 includes a proximal end 200, a distal end 202 and a floor 204 extending from the proximal and distal ends 200, 202 along a longitudinal axis of the floor 204, which is generally parallel to the longitudinal axis LA of the vehicle 50. When received in the internal storage area 64, the cradle 102 is disposed such that the distal end 202 is located at the rear end 54 of the vehicle 50 and the proximal end 200 is located in the internal storage area 64 towards the front end 52 of the vehicle 50.

As best seen in FIGS. 3, 4, 5 and 6, the ramp assembly 104 includes two different, distinct or separate ramp portions, elements or members: a proximal or first ramp member 106 hingeably connected to the cradle 102 and a distal or second ramp portion 108 that is separate from the first ramp member 106 and that is engageable with the first ramp member 106.

The first ramp member 106 is movable between a raised or first position in which the first ram member 106 is generally parallel to the height plan HP, as shown in FIG. 1, and a lowered or second position in which the first ramp member 106 is oriented towards the ground surface GS, as shown in FIG. 3. When the first ramp member 106 is in the second position, the second ramp member 108 may be moved or rolled from a first position to a deployed or second position in which the second ramp member 108 engages the first ramp member 106 at one end, is oriented towards the ground surface GS, and a portion of its bottom surface contacts the ground surface at its distal end, as shown in FIG. 4. When the first ramp member 106 is in the second position and the second ramp member 108 is in the second position, the ramp assembly 104 extends generally continuously from the vehicle body 60 to the ground surface GS and thereby allows the wheelchair to roll over top rolling surfaces defined by the first and second ramp members 106, 108 between the ground surface GS and the internal storage area 64 to provide access into or exit from the internal storage area 64.

The second ramp member 108 is also movable into one of a stowed or first storage position and an upright or second storage position, wherein in both storage positions, the second ramp member 108 is completely confined within the internal storage area 64.

In the first storage position, as shown in FIG. 3, the second ramp member 108 is disposed and held generally horizontally in the cradle 102. In this position, the second ramp member 108 takes up a relatively small amount of space and the cradle 102 can be used to receive cargo on top of the second ramp member 108. Moreover, when the second ramp member 108 is in the first storage position, the second ramp member 108 overlaps the floor 204 of the cradle 102 such that the second ramp member 108 is entirely confined within the internal storage area 64.

In the second storage position, as shown in FIGS. 7 and 8, the second ramp member 108 is disposed and held generally vertically in a height plane generally parallel to the height plane HP. In the second storage position, the second ramp member 108 is moved into the cradle 102 for storage after the wheelchair has been rolled up the ramp assembly 104 and is received in the cradle 102. The second ramp member 108 may further serve as a backrest to prevent the wheelchair and the wheelchair passenger sitting in the wheelchair from moving and/or tilting rearwardly during transportation in the vehicle 50.

When the second ramp member 108 is in one of the first and second storage positions, the first ramp member 106 can be moved to the first position.

When the second ramp member 108 is moved from the first position, or from the first storage position, to the second position wherein it is oriented towards the ground surface and a portion of its bottom surface contacts the ground surface at its distal end, it is understood that the second ramp member 108 at least partially overlaps the first ramp member 106 during this movement of the second ramp member 108 with respect to the cradle 102 and/or with respect to the first ramp member 106 along the longitudinal axis LA.

Referring to FIGS. 5, 6 and 8, the cradle 102 includes left and right side walls 206, 208 and a front wall 210 extending upwardly from the floor 204. More specifically, the left and right side walls 206, 208 are spaced apart and extend longitudinally to the floor 204, while the front wall 210 extends between the left and right side walls 206, 208 transversely to the floor 204 at the proximal end 200. Once the wheelchair has rolled up on the ramp assembly 104, it is received in the cradle 102, on the floor 204 and between the left and right side walls 206, 208. The left and right side walls 206, 208 are therefore spaced by a transversal distance which is greater than a width of the wheelchair. For example, the left and right side walls 206, 208 may be spaced by a transversal distance of 32 inches to receive a wheelchair having a standard width of about 30 inches or less. Alternatively, the left and side walls 206, 208 may be spaced by a transversal distance of more or less than 32 inches.

The floor 204 includes a front floor portion 212 located towards the proximal end 200, a rear floor portion 214 located towards the distal end 202 and an intermediate floor portion 216 extending between the front and rear floor portions 212, 214 along the longitudinal axis LA. In the illustrated embodiment, the first floor portion 212 extends along a first floor plane and the second floor portion 214 extends along a second floor plane which is generally parallel to the first floor plane and which is spaced downwardly from the first floor plane. The intermediate floor portion 216 further extends along a third floor plane which is angled relative to the first and second floor planes and which intersects the first and second floor planes. Specifically, the intermediate floor portion 216 slopes downwardly and rearwardly from the front floor portion 212 to the rear floor portion 214. Alternatively, the floor could include a single planar portion extending from the proximal end 300 to the distal end 302 of the cradle 102. In yet another embodiment, the floor could instead include two floor portions or more than three floor portions arranged and angled relative to each other according to any other configuration which a skilled person would consider to be appropriate to receive a wheelchair thereon.

The cradle 102 also includes left and right pairs of lower pins 218, 220 extending inwardly from the left and right side walls 206, 208 of the cradle 102, respectively. The pairs of lower pins 218, 220 are located towards the distal end 202 of the cradle 102 and near the floor 204. Each pair of lower pins 218, 220 are adapted to cooperate with the second ramp member 108 to hold the second ramp member 108 in the second storage position.

Moreover, the cradle 102 includes left and right upper pins 222, 224 extending inwardly from the left and right side walls 206, 208 of the cradle 102, respectively. The left and right upper pins 222, 224 are located towards the distal end 202 of the cradle 102 and near the floor 204 and are spaced upwardly from the floor 204. The upper pins 222, 224 are adapted to cooperate with the second ramp member 108 to hold the second ramp member 108 in the second storage position.

In addition, the cradle 102 includes left and right housings 226, 228 defined respectively in the left and right side walls 206, 208 of the cradle 102. More specifically, each housing 226, 228 includes a hook member 230 extending into the cradle 102 and defining a housing recess 232 facing towards the distal end 202 of the cradle 102. The housings 226, 228 are adapted to cooperate with the second ramp member 108 to hold the second ramp member 108 in the first storage position.

Referring to FIGS. 2 to 6, the first ramp member 106 includes a proximal end 240, a distal end 242 located opposite the proximal end 240 and left and right side edges 244, 246 which extend between the proximal end 240 and the distal end 242, parallel to the longitudinal axis LA. The proximal end 240 is hingeably connected to the distal end 202 of the cradle 102 via an elongated hinge 248 extending transversely to the first ramp member 106, while the distal end 242 is free and moves along an arcuate travel path as the first ramp member 106 is pivoted between the second and first positions. The first ramp member 106 further includes a first top surface 250 defined between the proximal and distal ends 240, 242 and an opposed first bottom surface 252. The first top surface 250 is generally rectangular and is elongated transversely to the first ramp member 106. When the first ramp member 106 is in the second or lowered position, the first top surface 250 generally faces upwardly and slightly rearwardly to thereby define a first rolling surface 253 on which the wheelchair may roll to enter or exit the internal storage area 64 and a portion of the first bottom surface 252 contacts the ground surface GS.

When the first ramp member 106 is in the first position, the first ramp member 106 extends transversely between the left and right bumper portions 72, 74 and is generally aligned with the left and right external surfaces 76, 78 of the rear bumper 70. As best seen in FIGS. 3 and 4, the first ramp member 106 defines the first rolling surface 253 at the first top surface 250 and define a central bumper portion 73 having the first bottom surface 252 of the first ramp member 106. As best seen in FIGS. 2 and 7, in the first position, the first ramp member 106, the first bottom surface 252 is located in a height plane that is generally parallel to the height plane HP of the vehicle such that the first bottom surface 252 is generally aligned with the left and right external surfaces 76, 78 of the bumper portions 72, 74 and such that the left and right bumper portions 72, 74 and the central bumper portion 73 define the external rear surface of the bumper 70 that could extend generally continuously along the transversal axis TA. It is understood that the first ramp member 106 may act as a gate that is part of the bumper 70 and that closes the access space 75 when the first ramp member 106 is in the first position. It is also understood that the first ramp member 106 may comprise a handle or any other types of actuators accessible by at least one hand of the user to allow the user to lock and unlock the first ramp member 106 with respect to the vehicle body 60 and/or to open and close the first ramp member 106 between the first and second positions.

The first ramp member 106 also includes left and right side walls 254, 256 extending upwardly from the first top surface 250 along the left and right side edges 244, 246, respectively, and left and right projections, pegs or pins 258, 260, as best shown in FIG. 3, which extend inwardly from the left and right side walls 254, 256 towards each other. More specifically, the left and right pins 258, 260 are located near the distal end 242 of the first ramp member 106 and are configured for removably engaging the second ramp member 108 when the first ramp member 106 and the second ramp member 108 are each in the second position.

The first bottom surface 252 of the first ramp member 106 is defined by a rectangular planar portion 262 located towards the proximal end 240 of the first ramp member 106 and a support portion 264 located towards the distal end 242. More specifically, the support portion 264 convexly bulges away from the first ramp member 106 and contacts the ground surface GS when the first ramp member 106 is in the second position. As shown in FIGS. 3 and 4, when a portion (support portion 264) of the first bottom surface 252 contacts the ground surface GS proximate the distal end 242 when the first ramp member 106 is in the second or lowered position, the first top surface 250 is spaced from the ground surface GS. The second ramp member 108, when positioned in the second position, extends between the distal end 242 of the first ramp member 106 and the ground surface GS. Therefore, when in the second position, as shown in FIG. 4, the second ramp member 108 acts as an extension of the first ramp member 106 to allow the ramp assembly 104 to reach the ground surface GS.

The first ramp member 106 may comprise left and right protuberances 77, 79 mounted on the support portion 264 of the first bottom surface 252 adapted to contact the ground surface GS when the first ramp member 106 is in the second position as shown in FIGS. 3 and 4. It is understood that the left and right protuberances 77, 79 may be made of a soft, shock absorbing or elastic material such as natural or vulcanized rubber, neoprene, silicone, foam having an external surface offering friction and/or impact resistance against the ground surface GS such that these protuberances offer relative long term durability. With the left and right protuberances 77, 79, since the remainder of the first bottom surface 252 of the first ramp member 106 does not directly contact the ground surface GS, these protuberances help to maintain the quality or appearance of the first bottom surface 252. It is however understood that the left and right protuberances 77, 79 may be omitted and, for instance, the first bottom surface 252 may comprise or be made of a material offering friction and/or impact resistance against the ground surface GS such that it has a relative long term durability for its quality and/or appearance.

Figure 10:
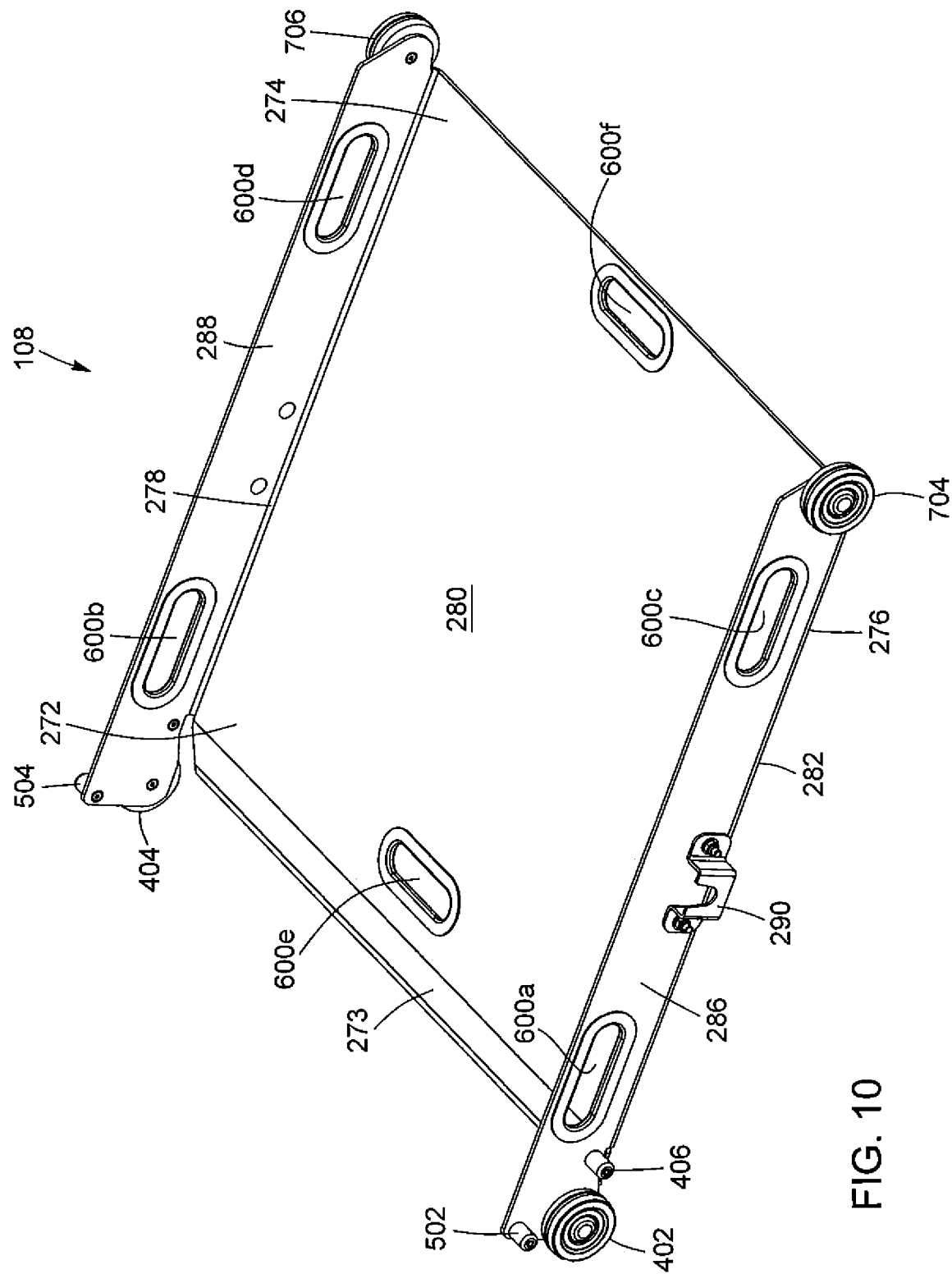
FIG. 10 is a perspective view of the second ramp member shown in isolation.
Figure 11:
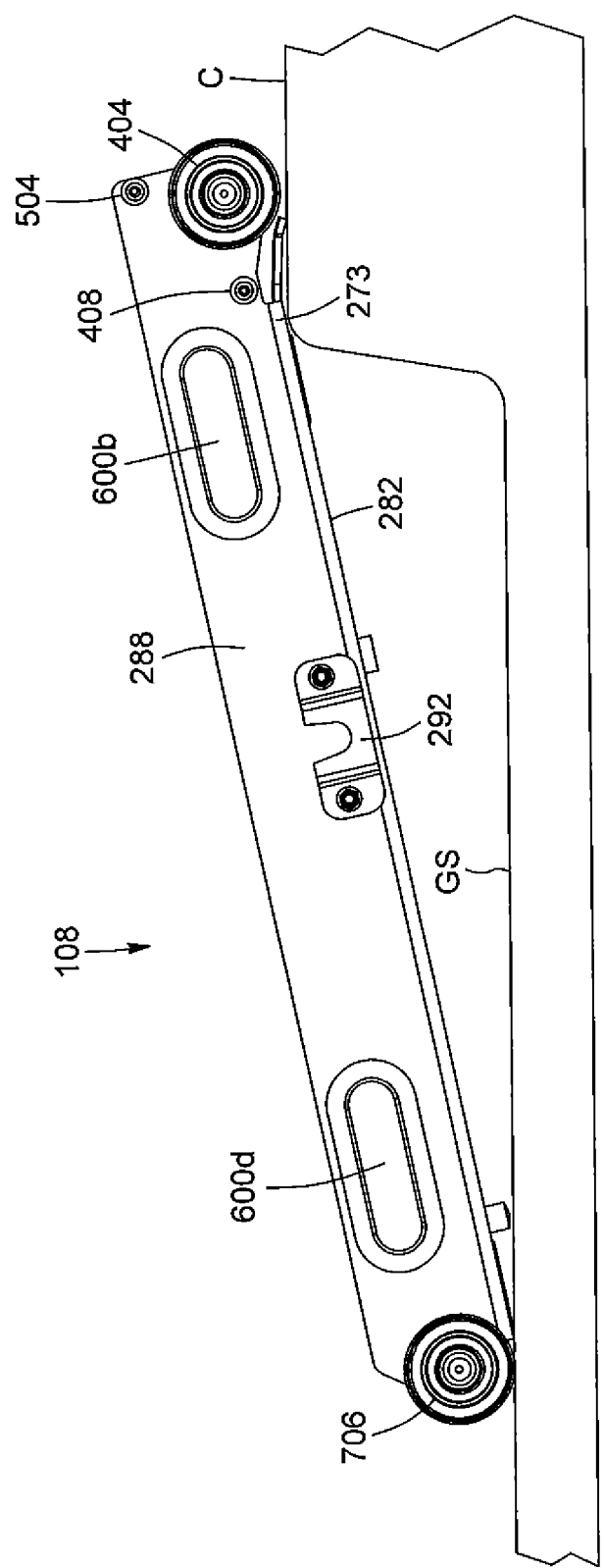
FIG. 11 is an elevational side view of the second ramp member shown in a curb position.

Referring to FIGS. 4, 10 and 11, the second ramp member 108 includes a planar, generally rectangular body panel having a proximal end 272, a distal end 274 located opposite the proximal end 272 and left and right side edges 276, 278 extending between the proximal and distal ends 272, 274. The second ramp member 108 also includes a second top surface 280 which extends between the proximal and distal ends 272, 274 and between the left and right side edges 276, 278, and a second bottom surface 282 opposite the second top surface 280. When the second ramp member 108 is in the second position, the second top surface 280 faces upwardly and slightly rearwardly to thereby define a second rolling surface 284 on which the wheelchair may roll to enter or exit the internal storage area 64.

As best shown in FIG. 4, the first rolling surface 253 of the first ramp member 106 and the second rolling surface 284 of the second ramp member 108 are adjacent each other at one end, with the first rolling surface 253 extending between the second rolling surface 284 and the cradle 102, to provide a generally continuous rolling surface for the wheelchair to roll on between the ground surface GS and the cradle 102. Specifically, to enter the internal storage area 64 of the vehicle 50 from the ground surface GS, the wheelchair would first roll from the ground surface GS onto the second rolling surface 284, across the second rolling surface 284 from the distal end 274 to the proximal end 272 of the second ramp member 108, across the first rolling surface 253 from the distal end 242 to the proximal end 240 of the first ramp member 106, off from the first ramp member 106 and onto the floor 204 of the cradle 102. To exit the internal storage area 64 and reach the ground surface GS, the wheelchair would be rolled from the floor 204 of the cradle 102, onto the first rolling surface 253, onto the second rolling surface 284 and off from the second rolling surface 284 onto the ground surface GS.

The second ramp member 108 includes left and right side walls 286, 288 extending upwardly from the second top surface between the proximal end and the distal end, along the left and right side edges 276, 278. The second ramp member 108 further includes left and right stop members 290, 292 extending outwardly from the left and right side walls 286, 288. Each stop member 290, 292 includes a C-shaped recess, best shown in FIGS. 6, 10 and 11, which faces away from the second top surface 280. Each C-shaped recess of the stop members 290, 292 is adapted to receive each of corresponding upper pins 222, 224 of the cradle 102 when the second ramp member 108 is in the second position to hold the second ramp member 108 in the second position.

Referring to FIGS. 4, 10 and 11, the second ramp member 108 includes a pair of contacting members located at the proximal end 272 of the second ramp member 108. The contacting members are adapted to contact the floor 204 and/or the first top surface 250 of the first ramp member 106 and allow the second ramp member 108 to be moved from the first position where the second ramp member 108 at least partially overlaps the floor 204 of the cradle 102 and/or the first top surface 250 of the first ramp member, and along the first top surface 250 into the second position without requiring the second ramp member 108 to be completely entirely lifted off of the floor 204 and/or of the first top surface 250. Similarly, the contacting members are adapted to contact the first top surface 250 of the first ramp member 106 and allow the second ramp member 108 to be moved from the second position, and along the first top surface 250 and/or along the floor 204 into the first storage position or into the second storage position without requiring the second ramp member 108 to be completely entirely lifted off of the first top surface 250 and/or of the floor 204.

In the illustrated embodiment, the contacting members include left and right proximal wheels 402, 404. More specifically, each one of the left and right proximal wheels 402, 404 is rotatably mounted to a wheel axle extending outwardly from the corresponding side walls 286, 288.

Figure 4A:
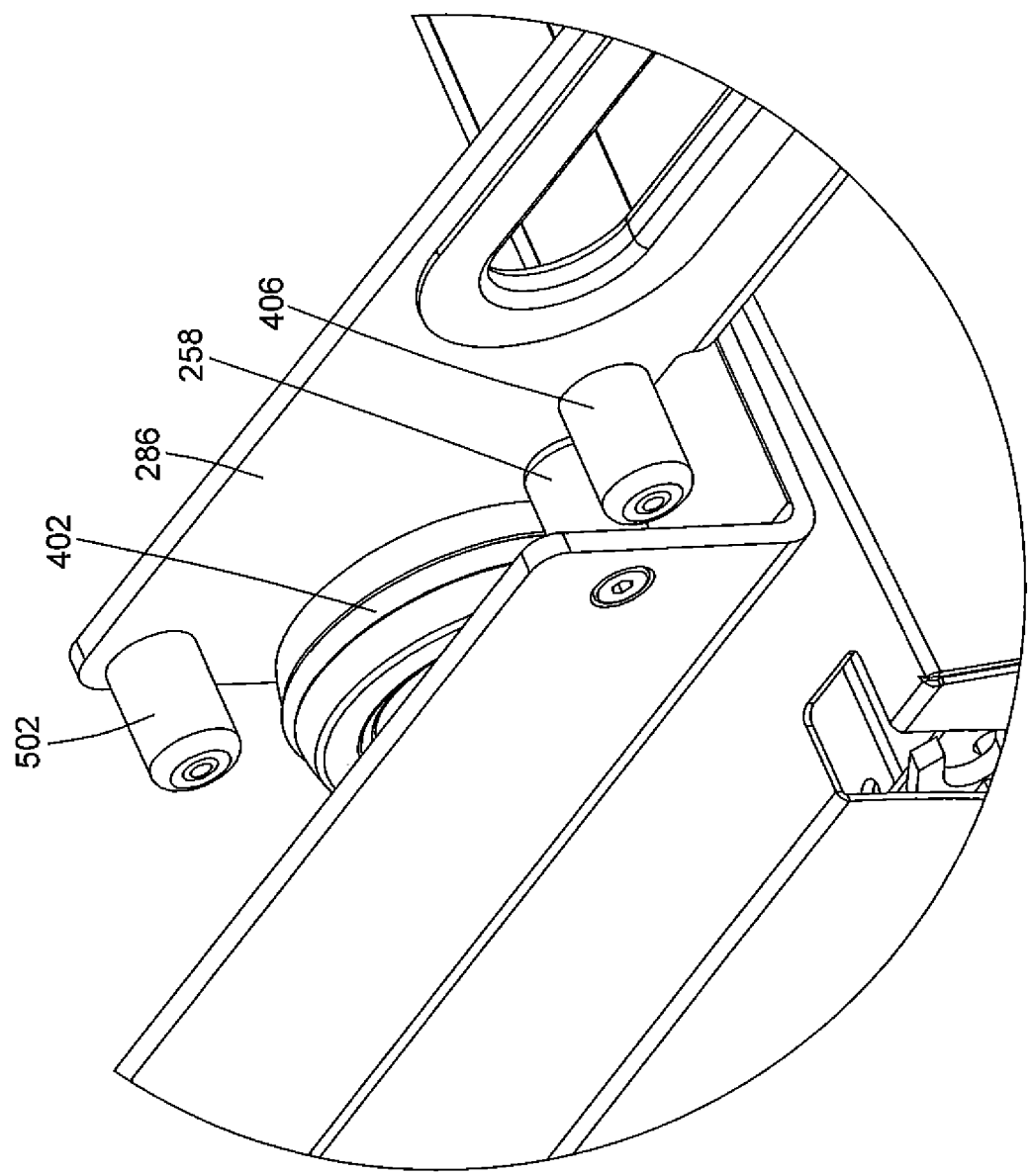
FIG. 4A is an enlarged view taken from FIG. 4.

The second ramp member 108 also includes left and right projections or pins 406, 408 extending outwardly from the respective left and right side walls 286, 288, near the left and right proximal wheels 402. More specifically, each the left and right pins 406, 408 is spaced rearwardly from each of the corresponding left and right proximal wheels 402, 404 to define therebetween a space adapted to receive each of the corresponding respective left and right pins 258, 260 when the second ramp member 108 is in the second position. In this position, the left and right proximal wheels 402, 404 abut against first sides of the respective left and right pins 258, 260 of the first ramp member 106 and the left and right pins 406, 408 of the second ramp member 108 abut against second sides of the respective left and right pins 258, 260 of the first ramp member 106 such that the second ramp member 108 is locked in its second position (see FIG. 4A showing the wheel 402 abutting the pin 258 on its proximal side and the pin 406 abutting the pin 258 on its distal side). It is thus understood that the space width between the wheel 402 and pin 406 generally corresponds to a width of the pin 258 such that the pin 258 is tightly received in this space defined between the wheel 402 and pin 406 for locking in place the second ramp member 108 in the second position when the user pivots downwardly the second ramp member 108 and pin 406 with respect to the pin 258 while also allowing the user, by pivoting upwardly the second ramp member 108 and pin 406 with respect to the pin 258, to disengage the second ramp member 108 with respect to the first ramp member 106 such that the second ramp member 108 could be a moveable ramp that could be used independently from the first ramp member 106 and from the vehicle 50.

The second ramp member 108 also includes left and right locking projections, pegs or pins 502, 504 extending outwardly from the left and right side walls 286, 288, respectively. Each of the left and right pins 502, 504 is located generally above each of corresponding proximal wheels 402, 404 and is each adapted to cooperate with each a corresponding channel 221 defined between corresponding left and right pair of lower pins 218, 220 of the cradle 102 to hold the second ramp member 108 in the second storage position.

To facilitate the handling of the second ramp member 108, the second ramp member 108 includes a plurality of openings 600 for allowing the user to move the second ramp member 108 from one position to another position. Specifically, the second ramp member 108 includes proximal left and right openings 600a, 600b defined in the left and right side walls 286, 288 near the proximal end 272 and distal left and right openings 600c, 600d defined in the left and right side walls 286, 288 near the distal end 274. Each opening 600 is generally oblong and is sized and shaped to allow hands of the user to grip the left and right side walls 286, 288 of the second ramp member 108. In the illustrated embodiment, the second ramp member 108 further includes proximal and distal central openings 600e, 600f defined in the body panel near the proximal and distal ends 272, 274. The proximal and distal central openings 600e, 600f are similar to the proximal and distal left and right openings 600a, 600b, 600c, 600d.

To move the second ramp member 108 from the second position to one of the first and second storage positions, the distal end 272 of the second ramp member 108 may simply be lifted off the ground such that the second ramp member 108 pivots about the left and right proximal wheels 402, 404 until the holding pins 406, 408 clear the ramp retaining pins 258, 260 of the first ramp member 106. The second ramp member 108 may then be pushed further forward along the first ramp member 106 such that the second ramp member 108 is rolled over the first top surface 250 of the first ramp member 106 until the proximal wheels 402, 404 abut the left and right pairs of lower pins 218, 220 of the cradle 102. From this configuration, the second ramp member 108 may be moved to the first storage position by pushing the second ramp member 108 further forward such that the proximal wheels 402, 404 roll up and over the left and right pairs of lower pins 218, 220 and roll over the floor 204 up to the first storage position, best shown in FIG. 2, or the distal end 274 of the second ramp member 108 may be pushed and moved upwardly and towards the internal storage area 64 up to the second storage position shown in FIGS. 7 and 8.

As described above, the second ramp member 108 is separate from the first ramp member 106. Moreover, while the first ramp member 106 is secured to the cradle 102 via the elongated hinge 240, the second ramp member 108 is not permanently secured to the first ramp member 106 and/or to the cradle 102. More specifically, the second ramp member 108 is detachable from the first ramp member 106 and from the cradle 102, such that the second ramp member 108 may be completely removed from the first ramp member 106 or from the cradle 102 and be used by the user as a stand-alone ramp.

Referring to FIG. 11, the second ramp member 108 may, for example, be moved to a curb position wherein the second ramp member 108 at least partially overlaps a curb C elevated relative to the ground surface GS to allow the wheelchair to roll over the second top surface 280 and move from the ground surface GS to the curb C.

As best shown in FIGS. 6, 10 and 11, the second ramp member 108 includes left and right distal wheels 704, 706 located at the distal end 274 of the second ramp member 108. Each one of the left and right distal wheels 704, 706 is rotatably mounted to a wheel axle extending outwardly from the corresponding side walls 286, 288. The left and right distal wheels 704, 706 may allow the second ramp member 108 to be rolled over the ground surface GS from the vehicle 50 to the curb C by lifting the proximal end 272 of the second ramp member 108. As best seen in FIGS. 10 and 11, the second ramp member 108 includes a gripping portion 273 at the proximal end 272 of the second ramp member 108 and provided on the second bottom surface 282. The gripping portion 273 curves generally downwardly and is adapted to sit on the curb C for frictionally engaging the curb C when the second ramp member 108 is in the curb position. Additionally, or alternatively, the second bottom surface 282 may be covered in an anti-slip material for helping to prevent the second ramp member 108 from slipping or rolling away from the curb C. When the proximal end 272 is lifted off the curb C, only the left and right distal wheels 704, 706 contact the ground surface GS and the second ramp member 108 may therefore be rolled on the ground surface GS. The left and right distal wheels 704, 706 may further be used for rolling the second ramp member 108 over the first top surface 250 of the first ramp member 106.

When the second ramp member 108 is moved from the first position or the first storage position to the second position, it is understood that user first needs to lift the proximal end 274 of the second ramp member 108 to unlock the distal end 272 from the left and right housings 226, 228 and then moved second ramp member 108 such that the distal wheels 704, 706 roll up and over the left and right pairs of lower pins 218, 220, the second ramp member 108 may continue to be moved by the user up to a position where the proximal wheels 402, 404 abut the left and right pairs of lower pins 218, 220 and where the second ramp member 108 may be moved further such that the proximal wheels 402, 404 roll up and over the left and right pairs of lower pins 218, 220, and afterwards, the second ramp member 108 may continue to be moved by the user over the first top surface 250 of the first ramp member 106 up to the second position of the second ramp member 108.

In the first storage position, the bottom surface 282 of the second ramp member 108 faces towards the floor 204 of the cradle 102 and the second ramp member 108 fully or at least partially overlaps the floor 204 of the cradle 102 such that the second ramp member 108 is entirely confined within the internal storage area 64. In this position, the distal end 274 of the second ramp member 108 is disposed near the first ramp member 106 once the first ramp member has been moved to the first position and the proximal left and right wheels 402, 404 are received in the left and right housings 226, 228, which lock the second ramp member 108 in the first storage position. More specifically, the hook member 230 of each housing 226, 228 defines an inner shoulder which extends towards the floor 204 of the cradle 102 into the housing recess 232. In the first storage position, the locking pins 502, 504 of the second ramp member 108 abut the inner shoulder, which prevents the second ramp member 108 from being moved rearwardly along the floor 204 of the cradle 102. To move the second ramp member 108 from the first storage position to another position, the second ramp member 108 must first be angled by lifting the distal end 274 of the second ramp member 108 to pivot the second ramp member 108 about the proximal wheels 402, 404 until the locking pins 502, 504 have moved below the inner shoulder. The second ramp member 108 may then be pulled rearwardly out of engagement with the housings 226, 228 and moved and/or rolled over the floor 204 and/or the first top surface 250 of the first ramp member 106.

Referring to FIGS. 7 and 8, when the first ramp member 106 is in the first position and the second ramp member 108 is in the second storage position, the first top surface 250 of the first ramp surface 106 faces a portion of the bottom surface 282 of the second ramp member 108.

Figure 9:
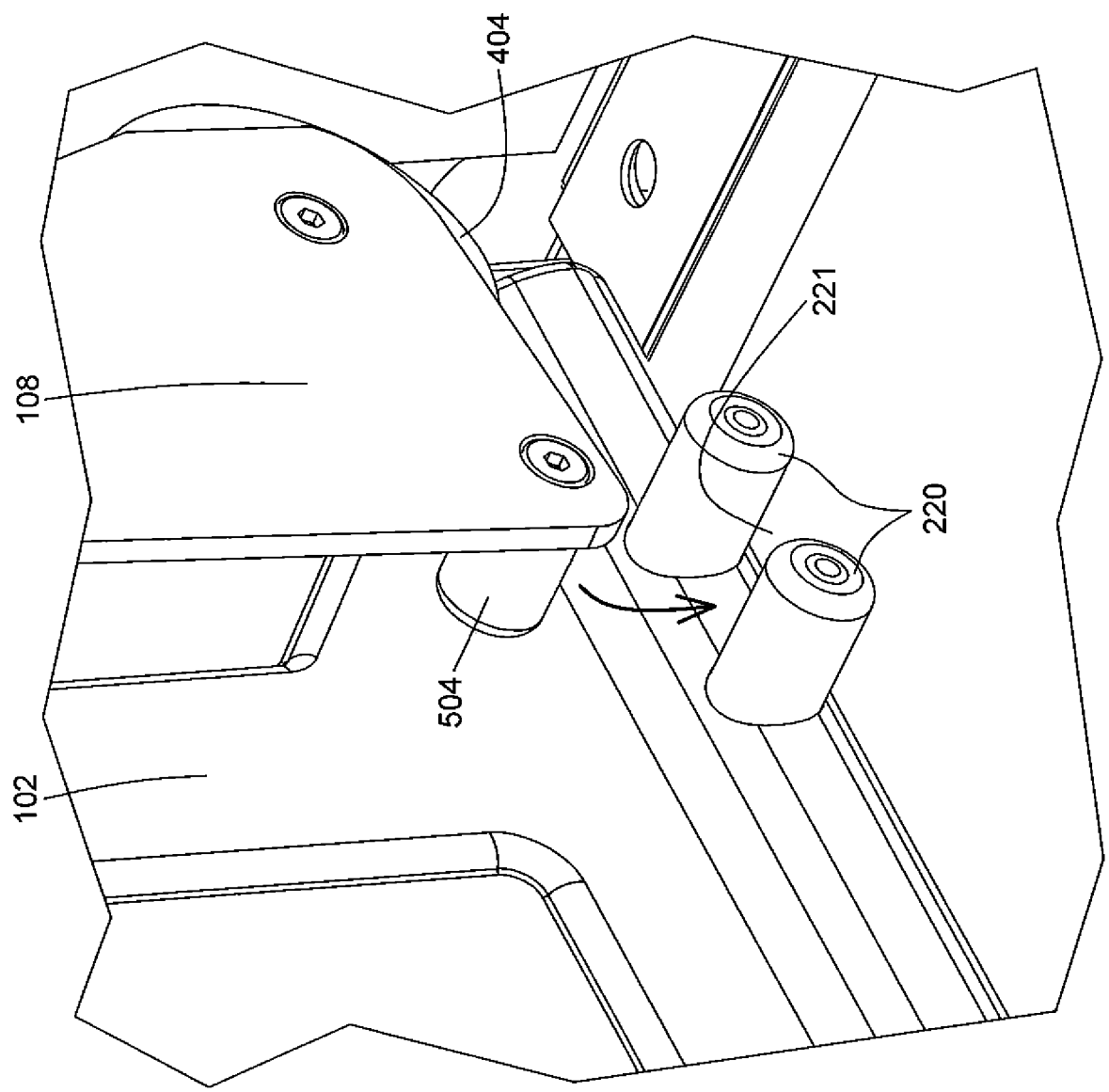
FIG. 9 is an enlarged view of the ramp system showing the second ramp member to be locked in the second storage position.

Referring to FIG. 9, the second ramp member 108 is held in the second storage position by the pins 502, 504 engaging the left and right pairs of lower pins 218, 220. More specifically, the pins of each one of the left and right pairs of lower pins 218, 220 are each spaced from each other to define the receiving channel 221. Each of the left and right pin 502, 504 is thereby received in the channel 221 which each prevents further movement of the proximal end 274 of the second ramp member 108. To allow each of the left and right pins 502, 504 to be received in the channel 221, the second ramp member 108 may be first rolled over the first top surface 250 of the first ramp member 106 when the first ramp member 106 is in the second position, until the proximal wheels 402, 404 abut the distal one of the left and right pairs of lower pins 218, 220. As shown in FIG. 9, the second ramp member 108 may then be pivoted at its proximal end by moving the second ramp member towards the interior and then downwardly such that each of the left and right pins 502, 504 is received in the channel 221.

The left and right stop members 290, 292 are further aligned with the upper pins 222, 224 of the cradle 102, which are received in the C-shaped recesses 700 of the stop members 290, 292 to prevent further pivoting of the second ramp member 108. The first ramp member 106 can then be moved to the first position to eventually allowing closing of the rear door 68 of the vehicle 50.

It is understood that the first position of the second ramp member 108 covers any position where the second ramp member 108 is no longer in the horizontal/vertical storage position, or any position where the second ramp member 108 is no longer in the curb position, and where, in this first position, the user has or will have the second ramp member 108 in hand (at or proximate the distal end 274) to move the second ramp member 108 up to the second (deployed) position. As described above, during the movement of the second ramp member 108 from the first position up to its second position, the second ramp member 108 may at least partially overlap the floor 204 and/or the first top surface 250 of the first ramp member 106 when it moves and/or roll along the floor 204 and/or along the first top surface 250 of the first ramp member 106.

It is also understood that the variants, configurations and embodiments described above are merely provided as examples and that many alternative variants, configurations and embodiments may be considered. For example, instead of wheels 402, 404, 704, 706 that are rotatably mounted with respect to the second ramp member 108, the contacting members could include non-rotatable wheels or disks, sliding supports, projections, members or skates adapted to slide over the floor 204, and/or over the first top surface 250 of the first ramp member 106, and/or over the ground surface GS.

The above description of the variants, examples or embodiments should not be interpreted in a limiting manner since other variations, modifications and refinements are possible within the scope of the present invention. Accordingly, it should be understood that various features and aspects of the disclosed variants or embodiments can be combined with or substituted for one another in order to form varying modes of the disclosed invention. The scope of the invention is defined in the appended claims and their equivalents.

The invention claimed is:

1. A ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane of the vehicle that intersects the longitudinal axis, the ramp system comprising:
   a cradle being adapted to be received in the storage area, the cradle having left and right side walls, proximal and distal ends and a floor extending from the proximal and distal ends along the longitudinal axis and between the left and right side walls;
   a first ramp member comprising a proximal end hingeably connected to the distal end of the cradle, a distal end located opposite the proximal end, left and right side edges, a first top surface defined between the proximal and distal ends and left and right side edges of the first ramp member, and a first bottom surface opposite the first top surface; and a second ramp member comprising a proximal end, a distal end located opposite the proximal end, left and right side edges, a second top surface defined between the proximal and distal ends and left and right side edges of the second ramp member, and a second bottom surface opposite the second top surface;

wherein, in use, the first ramp member is pivotable between a first position, wherein the first bottom surface of the first ramp member is located in a height plane that is generally parallel to the height plane of the vehicle, and a second position, wherein the first ramp member is oriented towards the ground surface and a portion of the first bottom surface contacts the ground surface, the second ramp member is movable between first and second positions, wherein in the second position, the proximal end of the second ramp member is supported by the distal end of the first ramp member, the second ramp member is oriented towards the ground surface, and a portion of the second bottom surface contacts the ground surface proximate the distal end of the second ramp member;

wherein, when the first and second ramp members are each in the second position, the first and second top surfaces of the first and second ramp members define rolling surfaces allowing a wheelchair to roll over the first and second surfaces to access or exit the storage area;

wherein, in use, after being in the second position, the second ramp member is detachable from the first ramp member for allowing a user to move the second ramp member to a curb position wherein the second ramp member at least partially overlaps a curb to allow the wheelchair to roll over the second top surface and move from the ground surface to the curb position; and wherein the first ramp member comprises left and right projections and the second ramp member comprises left and right wheels located at its proximal end and left and right projections near the left and right wheels and wherein, in the second position of the first and second ramp members, the left and right wheels abut against first sides of the respective left and right projections of the first ramp member and the left and right projections of the second ramp member abut against second sides of the respective left and right projections of the first ramp member such that the second ramp member is locked in its second position.

2. The ramp system of claim 1, wherein, when the second ramp member is in the first position, the second ramp member at least partially overlaps the first ramp member.

3. The ramp system of claim 1, wherein before being in the first position, the second ramp member is in a first storage position wherein the second ramp member overlaps the floor of the cradle such that the second ramp member is entirely confined within the storage area.

4. The ramp system of claim 1, wherein before being in the first position, the second ramp member is in a second storage position wherein the second ramp member is in a height plane that is generally parallel to the height plane of the vehicle such that the second ramp member is entirely confined within the storage area.

5. The ramp system of claim 4, wherein the left and right side walls of the cradle comprise left and right projections defining therebetween left and right channels and wherein left and right projections of the second ramp member are adapted to be inserted in the left and right channels such that the second ramp member is locked when it is in the second storage position.

6. The ramp system of claim 4, wherein, when the first ramp member is in the first position and the second ramp member is in the second storage position, the top surface of the first ramp member faces a portion of the bottom surface of the second ramp member.

7. The ramp system of claim 1, wherein the left and right wheels of the second ramp member are configured for rolling the second ramp member over the top surface of the first ramp member and/or over the floor surface of the cradle for moving the second ramp member.

8. The ramp system of claim 1, wherein the second ramp member further comprises left and right wheels located at its distal end for rolling the second ramp member over the ground surface from the vehicle to the curb.

9. The ramp system of claim 1, wherein the second ramp member comprises one opening for allowing a user to move the second ramp member.

10. The ramp system of claim 1, wherein the second ramp member comprises left and right side walls extending upwardly along its left and right edges, the left and right side walls comprising left and right openings for allowing a user to move the second ramp member, the left and right openings being sized and shaped to allow hands of the user to grip the left and right side walls of the second ramp member.

11. The ramp system of claim 1, wherein the second ramp member comprises at least one contacting member for contacting the top surface of the first ramp member and moving the second ramp member from the first position to the second position.

12. The ramp system of claim 11, wherein the at least one contacting member comprises the left and right wheels located at the proximal end of the second ramp member, or left and right wheels located at the distal end of the second ramp member, or the left and right wheels located at the proximal end of the second ramp member and the left and right wheels located at the distal end of the second ramp member.

13. The ramp system of claim 1, wherein the second ramp member comprises left and right side walls extending upwardly along its left and right edges, the left and right side walls comprising left and right openings for allowing the user to move the second ramp member.

14. A ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane of the vehicle that intersects the longitudinal axis, the ramp system comprising:

a cradle being adapted to be received in the storage area, the cradle having left and right side walls, proximal and distal ends and a floor extending from the proximal and distal ends along the longitudinal axis and between the left and right side walls;

a first ramp member comprising a proximal end hingeably connected to the distal end of the cradle, a distal end located opposite the proximal end, left and right side walls extending upwardly, a first top surface defined between the proximal and distal ends and left and right side walls of the first ramp member, and a first bottom surface opposite the first top surface, the left and right side walls each having external and internal sides, the first ramp member comprising left and right projections located adjacent its distal end and mounted on its left and right side walls on the internal sides; and a second ramp member comprising a proximal end, a distal end located opposite the proximal end, left and right side walls extending upwardly, a second top surface defined between the proximal and distal ends and left and right side walls of the second ramp member, and a second bottom surface opposite the second top surface, the left and right side walls each having external and internal sides, the second ramp member being detachable from the first ramp member, the second ramp member comprising left and right wheels located adjacent its proximal end and mounted on its left and right side walls on the external sides;

wherein, in use, the first ramp member is pivotable between a first position, wherein the first bottom surface of the first ramp member is located in a height plane that is generally parallel to the height plane of the vehicle, and a second position, wherein the first ramp member is oriented towards the ground surface and a portion of the first bottom surface contacts the ground surface, the left and right wheels being adapted to roll over the top surface of the first ramp member for moving the second ramp member between first and second positions, wherein in the second position, the left and right wheels abut the respective left and right projections of the first ramp member to prevent further movement of the proximal end of the second ramp member relative to the distal end of the first ramp member, the second ramp member is oriented towards the ground surface, and a portion of the second bottom surface contacts the ground surface proximate the distal end of the second ramp member; and wherein, when the first and second ramp members are each in the second position, the first and second top surfaces of the first and second ramp members define rolling surfaces allowing a wheelchair to roll over the first and second surfaces to access or exit the storage area.

15. The ramp system of claim 14, wherein, when the second ramp member is in the first position, the second ramp member at least partially overlaps the first ramp member.

16. The ramp system of claim 14, wherein before being in the first position, the second ramp member is in a first storage position wherein the second ramp member overlaps the floor of the cradle such that the second ramp member is entirely confined within the storage area.

17. The ramp system of claim 14, wherein before being in the first position, the second ramp member is in a second storage position wherein the second ramp member is in a height plane that is generally parallel to the height plane of the vehicle such that the second ramp member is entirely confined within the storage area.

18. The ramp system of claim 14, wherein the left and right side walls of the cradle comprise left and right projections defining therebetween left and right channels and wherein the second ramp member comprises left and right projections located adjacent its proximal end and mounted on the internal sides of its left and right side walls, the left and right projections of the second ramp member being adapted to be inserted in the left and right channels such that the second ramp member is locked when it is in the second storage position.

19. The ramp system of claim 14, wherein the left and right wheels are first left and right wheels and the second ramp member comprises second left and right wheels located adjacent its distal end and mounted on the external sides of its left and right side walls, wherein the second left and right wheels abut the ground surface when the second ramp member is in the second position, and wherein, after being in the second position, the second left and right wheels are adapted to roll over the ground surface such that the second ramp member is further movable to a curb position wherein the second ramp member at least partially overlaps a curb to allow the wheelchair to roll over the second top surface and moved from the ground surface to the curb.

20. The ramp system of claim 14, wherein the first and second left and right wheels are adapted to roll over the floor surface of the cradle for moving the second ramp member.

21. The ramp system of claim 14, wherein the second ramp member comprises left and right projections near the left and right wheels and wherein, in the second position of the first and second ramp members, the left and right wheels abut against first sides of the respective left and right projections of the first ramp member and the left and right projections of the second ramp member abut against second sides of the respective left and right projections of the first ramp member such that the second ramp member is locked in its second position.

22. A ramp system for a vehicle that is motorized for rolling over a ground surface, the motorized vehicle extending along a longitudinal axis and having an internal storage area, a rear door for providing access into the storage area, and a rear bumper extending along a transversal axis and having left and right external surfaces located in a height plane of the vehicle that intersects the longitudinal axis, the ramp system comprising:

a cradle being adapted to be received in the storage area, the cradle having left and right side walls, proximal and distal ends and a floor extending from the proximal and distal ends along the longitudinal axis and between the left and right side walls;

a first ramp member comprising a proximal end hingeably connected to the distal end of the cradle, a distal end located opposite the proximal end, left and right side edges, a first top surface defined between the proximal and distal ends and left and right side edges of the first ramp member, and a first bottom surface opposite the first top surface; and a second ramp member comprising a proximal end, a distal end located opposite the proximal end, left and right side edges, a second top surface defined between the proximal and distal ends and left and right side edges of the second ramp member, and a second bottom surface opposite the second top surface;

wherein, in use, the first ramp member is pivotable between a first position, wherein the first bottom surface of the first ramp member is located in a height plane that is generally parallel to the height plane of the vehicle, and a second position, wherein the first ramp member is oriented towards the ground surface and a portion of the first bottom surface contacts the ground surface, the second ramp member is movable between first and second positions, wherein in the second position, the proximal end of the second ramp member is supported by the distal end of the first ramp member, the second ramp member is oriented towards the ground surface, and a portion of the second bottom surface contacts the ground surface proximate the distal end of the second ramp member; when the first and second ramp members are each in the second position, the first and second top surfaces of the first and second ramp members define rolling surfaces allowing a wheelchair to roll over the first and second surfaces to access or exit the storage area; after being in the second position, the second ramp member is detachable from the first ramp member for allowing a user to move the second ramp member to a curb position wherein the second ramp member at least partially overlaps a curb to allow the wheelchair to roll over the second top surface and move from the ground surface to the curb position; and before being in the first position, the second ramp member is in a second storage position wherein the second ramp member is in a height plane that is generally parallel to the height plane of the vehicle such that the second ramp member is entirely confined within the storage area; and wherein the left and right side walls of the cradle comprise left and right projections defining therebetween left and right channels and wherein the proximal end of the second ramp member comprises left and right projections adapted to be inserted in the left and right channels such that the second ramp member is locked when it is in the second storage position.

* * * * *